Dec. 29, 1970   TOSHIKATSU IWASAKI ET AL   3,551,017
FAR INFRARED TRANSMISSON TYPE INTERFERENCE FILTER
Filed May 15, 1968

INVENTORS
TOSHIKATSU IWASAKI
TSUMORU SHIMOTAKAHARA

BY Craig & Antonelli
ATTORNEYS

United States Patent Office 3,551,017
Patented Dec. 29, 1970

3,551,017
FAR INFRARED TRANSMISSION TYPE INTERFERENCE FILTER
Toshikatsu Iwasaki and Tsumoru Shimotakahara, Katsutashi, Japan, assignors to Hitachi, Ltd., Tokyo, Japan, a corporation of Japan
Filed May 15, 1968, Ser. No. 729,152
Claims priority, application Japan, May 19, 1967, 42/31,455
Int. Cl. G02b 5/28
U.S. Cl. 350—1
10 Claims

ABSTRACT OF THE DISCLOSURE

A transmission type interference filter, particularly for use in the far infrared region of the optical spectrum, is formed from at least two groups of laminated layers of material. Each group includes a first plurality of layers of material having an index of refraction higher than the index of refraction of a second plurality of layers of material, which are alternately arranged with the first plurality of layers. Typically, the thickness of each of the layers in the first group is a quarter wavelength of a first frequency while the thickness of each layer in the second group is a quarter wavelength of a second frequency. Adhered to the two groups of layers is a matching layer whose thickness is typically half the thickness of each layer in the immediate adjacent group of layers.

---

Figure 1:
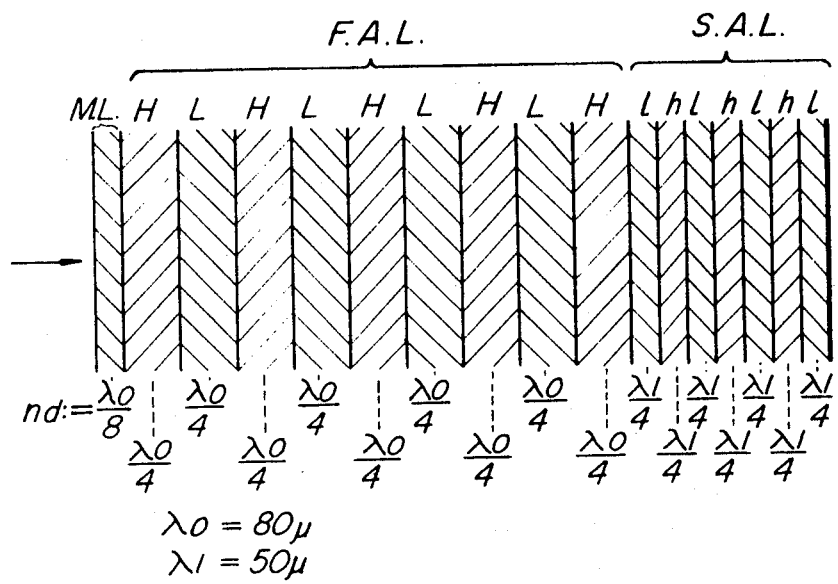

This invention relates to a transmission type interference filter and more particularly to a transmission type interference filter useful also in a far infrared region.

Generally, a wavelength region over $25\mu$ up to about 3 mm. observable as light is called a far infrared region. In a spectrophotometry in a far infrared region, a diffraction grating is used as dispersive element and a heat radiation source is generally employed as light source. The heat radiation source has such a property that the intensity of the radiation on a shorter wavelength side is larger than that of the radiation on a longer wavelength side and the diffraction grating has such a property that when a monochromatic light based on the dispersion of the diffraction grating is to be taken out into a predetermined light path, unnecessary higher order diffraction light on the shorter wavelength side is taken out from the light path in superposition with said monochromatic light. Accordingly, it is important in spectrophotometry which employs the diffraction grating to eliminate said unnecessary higher order diffraction light on the shorter wavelength side.

For the elimination of said unnecessary light on the short wavelength side in spectrophotometry in a far infrared region, a powder filter wherein reststrahlen crystal powder such as ZnO, BeO, etc. is mixed into a polyethylene film is considered to be the most effective at present. However, the powder filter suffers from the defect that the spectral transmittance curve does not rise sharply. As a filter wherein a spectral transmittance curve rises sharply, an interference filter is known. In such an interference filter, an alternate layer consisting of low refractive index layers and high refractive index layers is formed by vacuum deposition. Such an interference filter is expected to be effective not only as a short cut filter which eliminates the short wavelength light, but also as a monochromatic filter wherein a spectral transmittance curve rises sharply. Though the interference filter is effective in wavelength regions including an infrared region, however, it is practically quite difficult to make such a filter usable in a far infrared region. In an interference filter for a far infrared region, the thickness of each layer must be made large, but if the thickness of the respective layer is made large, each layer becomes liable to peel off due to the internal stress when the layer is made by vacuum deposition. Even if by chance the filter is fabricated well, each layer peels off due to internal stress when practically used and the filter becomes useless.

The transmission type interference filter according to this invention comprises an alternate layer wherein low refractive index layers and high refractive index layers are laminated closely alternately, at least said low refractive index layers containing transparent synthetic resin.

One of the objects of the present invention is to provide a novel transmission type interference filter which can solve the above mentioned troubles and problems. Another object of the invention is to provide an improved transmission type interference filter of which spectral transmittance curve rises sharply.

Further object of the invention is to provide a transmission type interference filter having such characteristics that peeling-off of respective layers in the filter does not take place at the fabrication as well as the practical usage thereof.

Still another object of the invention is provision of a transmission type interference filter of the above-mentioned character which can be manufactured quite easily.

Figure 2:
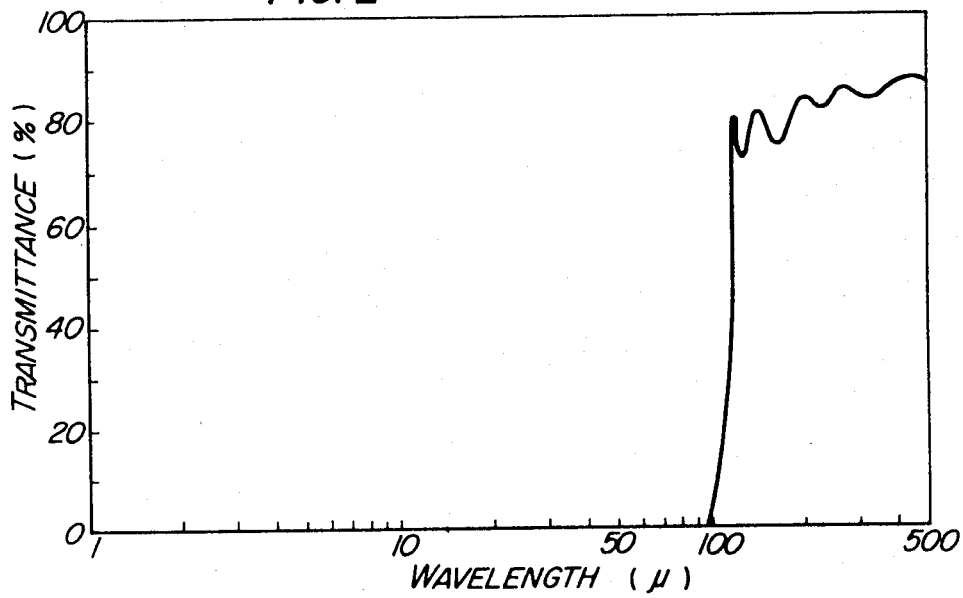
Figure 3:
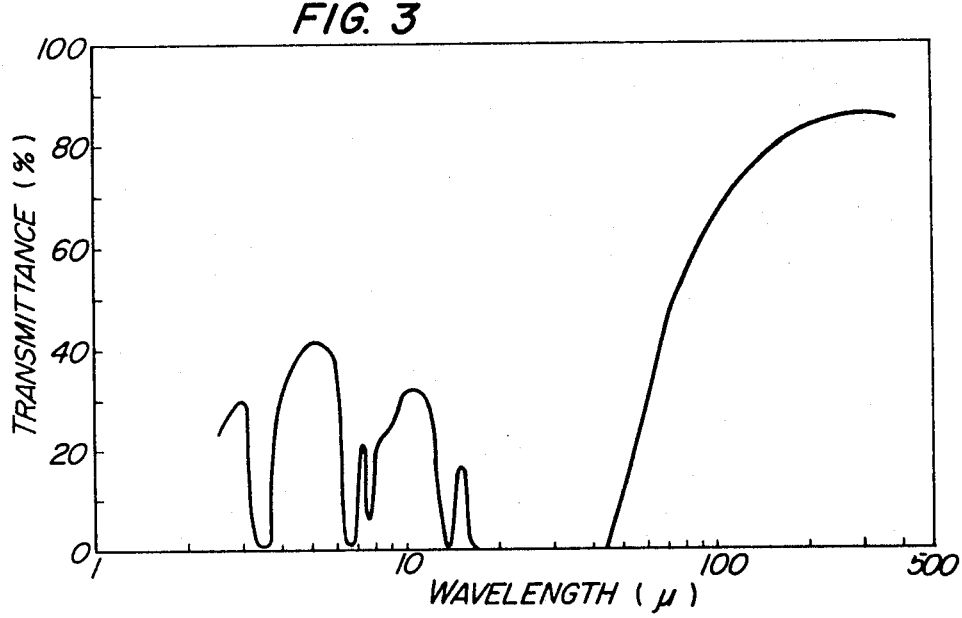

Other objects, features and advantages of this invention will become more apparent from the following detailed description of the invention taken in conjunction with the accompanying drawings; in which, FIG. 1 is a diagram showing the composition of a transmission type interference filter according to an embodiment of this invention, FIG. 2 shows a spectral transmittance curve obtained with the transmission type interference filter shown in FIG. 1, FIG. 3 shows a spectral transmittance curve obtained with a powder filter.

The transmission type interference filter shown in FIG. 1 consists of a first alternate layer F.A.L., a second alternate layer S.A.L. adhered to the right surface of said F.A.L., and a matching layer M.L. adhered to the left surface of said F.A.L. In said F.A.L., high refractive index layers H and low refractive index layers L are laminated closely alternately, and in said S.A.L. also, high refractive index layers $h$ and low refractive index layers $l$ are laminated closely alternately. The high refractive index layers H, $h$ are made of polyethylene including Ge powder at a rate of 91% in weight (refractive index $n=3.0$) and the low refractive index layers L, $l$ and the matching layer M.L. are formed exclusively of polyethylene (refractive index $n=1.46$). The optical thickness $nd$ ($n$: refractive index, $d$: geometrical thickness) of H, L is $\lambda_0/4$ ($\lambda_0=80\mu$), the optical thickness of $h$, $l$ is $\lambda_1/4$ ($\lambda_1=50\mu$), and that of M.L. is $\lambda_0/8$.

The transmission type interference filter shown in FIG. 1 is fabricated in the following way. A polyethylene plate is inserted between two revolving rollers and said two revolving rollers are rotated while heating said polyethylene plate to about 120° C. As the polyethylene plate is softened, the plate adheres to one of the revolving rollers. Then, Ge powder (at a rate of 91% in weight) is sprinkled over said softened polyethylene and said polyetheylene and said Ge powder are sufficiently mixed with a bamboo spatula while said revolving rollers are rotating. After they are uniformly mixed, heating is stopped. After a while, the polyethylene hardens. Then, the revolving rollers are stopped. In this way, high refractive index layers H, $h$ where $n=3.0$ are provided. The thickness of H, $h$ is determined by the gap between the two revolving rollers. On the other hand, though the low refractive index layers L, $l$ contain nothing but polyethylene, said two rollers are used to provide the optical thickness thereof $\lambda_0/4$, and $\lambda_1/4$. Naturally, it is possible to use polyethylene plates available on the market since polyethylene plates of various thickness are on the market. Since the matching layer M.L. is made only of polyethylene, it is possible to use polyethylene plates available on the market or to make the optical thickness of the plate $\lambda_0/8$ by using the two rollers as described hereinabove.

Then, the matching layer M.L., high refractive index layers H, $h$, and low refractive index layers L, $l$ must be adhered in the order shown in FIG. 1. In order to do this, "a heating-press method" is employed in this invention. Namely, the matching layer M.L., the high refractive index layers H, $h$, and the low refractive index layers L, $l$ are laminated in the order shown in FIG. 1, placed in a vacuum of the order of $10^{-3}$ mm. Hg, heated to about 100° C. to cause adhesion and applied with a pressure of about 10 kg./cm.$^2$ for about 10 minutes. Then, the layers completely adhere to each other. Thus, a transmission type interference filter as shown in FIG. 1 is provided. When such a filter was subjected to practical use for a long time, it was verified by the present inventors that peel-off of the layer once adhered did not take place and that the property as an interference filter was preserved.

The spectral transmittance curve obtained with the interference filter shown in FIG. 1 is shown in FIG. 2. FIG. 3 shows a spectral transmittance curve obtained with a powder filter. The powder filter used for obtaining the characteristics shown in FIG. 3 is formed by mixing $CaF_2$ and LiF each at a rate of 10% in weight into polyethylene.

Comparison of FIG. 2 and FIG. 3 indicates that the unnecessary light in a short wavelength region is absent in FIG. 2 and the spectral transmittance curve rises in extreme sharply.

In FIG. 1, the S.A.L. has an opaque region at about $65\mu \sim 97\mu$ and has another opaque region below about $40\mu$ due to the light scattering effect of Ge powder mixed thereinto, but it has a transparent region at about $40\mu \sim 65\mu$. However, the region of $40\mu \sim 65\mu$ is made opaque due to the presence of the S.A.L. Further, when the M.L. is absent, a relatively large ripple of the spectral transmittance curve shown in FIG. 2 appears in a transparent region over $97\mu$, but said ripple is diminished by the M.L. having an optical thickness of $\lambda_0/8$. Though the M.L. is adhered to the left surface of the F.A.L. in FIG. 1, the same effect can be obtained by adhering a matching layer of $\lambda_1/8$ in optical thickness to the right surface of the S.A.L.

In FIG. 2, the cutoff wavelength is present at about $97\mu$. However, generally in a transmission type interference filter comprising an alternate layer consisting of high refractive index layers and low refractive index layers, the transmittance of light having a wavelength $\lambda$ approaches zero when the optical thickness $nd$ of each layer satisfies the condition $nd = \lambda/4$, and the transmittance approaches zero more and more as the number of layers increases. Therefore, said cutoff wavelength can be changed by varying the optical thickness $nd$ of said respective layers. In practice, the wavelength $\lambda$ at which transmittance becomes zero has a width $\Delta\lambda$. Namely, when $nd = \lambda/4$, not only the transmittance of light of wavelength $\lambda$ approaches zero, but the transmittance of light of wavelengths lying in the width $\Delta\lambda$ including $\lambda$ approaches zero. If said $\Delta\lambda$ is named a cut width, the cut width becomes larger as the difference in refractive index $\Delta n$ between high refractive index layers and low refractive index layers increases. Further, as the number of layers is increased, the transmittance of light lying in the range $\Delta\lambda$ approaches more closely to zero and the spectral transmittance curve comes to rise more sharply.

The transmission type interference filter shown in FIG. 3 is a short cut filter which cuts short-wavelength light in its function, but a narrow bandpass filter can be fabricated by suitably selecting construction of the respective layers.

Though an embodiment of this invention is shown in FIG. 1, various changes or modifications may be made. Namely, (1) As a material for the low refractive index layers L, $l$ transparent synthetic resin, e.g. polymers like polypropylene, polycarbonate, polyvinylidene chloride, polyvinyl chloride, or polyethylene terephthalate polystyrene, polyester epoxy resin and the like can be used instead of polyethylene. The refractive index of these materials is about 1.5. As a material for the high refractive index layers H, $h$, the same materials as described hereinabove can be used instead of polyethylene into which a material of a high refractive index like Ge is mixed or a substance of Si or Ge can be used without mixing a material of a high refractive index like Te, ZnS, etc. The former has a refractive index $n = 3.0$ and the latter, $n = 4.0$.

(2) The low refractive index layers L, $l$ can be made by mixing a material having a low refractive index like $LiF$, $CaF_2$, $MgF_2$, $NaCl$, $KBr$, $BaF_2$ into said transparent synthetic resin. The refractive index of these low refractive index materials is less than about 1.5.

(3) In addition to a simple substance of Si, Ge, a material made by mixing a high refractive index material like Si, Ge, Te, ZnS, TlCl, TlBr, TlI, etc. into said transparent synthetic resin can be used for the high refractive index layers H, $h$. The refractive index of these high refractive index materials is more than about 2.0.

(4) Only two alternate layers F.A.L. and S.A.L. are present in FIG. 1, but the number thereof can be increased if necessary.

(5) Though the filter in FIG. 1 is made by a so-called heating press method, it is possible, in practice, to form the filter by an adhesion method using adhesives like epoxy adhesives. However, it is more preferable to use a heating press method, since the thickness of the adhered layers sensitively influences the spectral transmittance curve thereof and also the technique of fabrication is not necessarily simple.

(6) Though the pressure was about 10 kg./cm.$^2$ and the heating temperature was about 100° C. When the filter shown in FIG. 1 was fabricated by a heating-press method, these quantities are not fixed, but can be changed as required.

In the invention the transparent synthetic resin such as polyethylene, polypropylene, polyvinylidene chloride, polyethyleneterephthalate, polystyrene, polyester, polycarbonate, epoxy resin, polyoxymethylene, etc. may be used as a material for respective layers having low refractive index and as a suspended material for respective layers containing reststrahlen crystal powders may be used such as Si, Ge, TlCl, KBr, KCl, NaCl, KI, TlI, etc.

Thermoset resin and thermoplastic resin are utilized equivalently in the invention when the synthetic resins have desirable light transmittance in far infrared region.

As explained in the foregoing, when the transparent synthetic resin is used as the respective layers according to the invention, a plurality of the synthetic resin layers and a plurality of the high refractive index layers are laminated closely alternately by means of heat-pressing or adhering so as to form a configuration of alternative high and low refractive index layers, in which the synthetic resin layers as low refractive index layers may contain the low refractive index powders or may not contain, and the high refractive index layers may be not only made of plates or sheets of the high refractive index material such as Si, Ge, etc., but also made of mixtures of the high refractive powder and the transparent synthetic resin.

It will be apparent that the desired transmission type interference filter of the invention is also able to be fabricated by painting liquified or slurried synthetic resin as low refractive index material and the high refractive index material respectively.

When the synthetic resin is used as suspending material of the reststrahlen crystal powder, the filter of the invention is also fabricated by painting alternately liquid or slurry of the above-mentioned synthetic resin or mixtures composed of the synthetic resin and the reststrahlen powder so as to form alternate laminated layers of high and low refractive index layers.

It is to be noted that the scope of this invention is not limited by the foregoing description of some embodiments of this invention, but the scope of this invention is defined by the appended claims.

We claim:

1. A transmission type interference filter for filtering radiation particularly in the far-infrared range comprising at least two groups of laminated layers of alternately different materials, wherein each of said groups laminated layers includes a first material having a refractive index relatively low with respect to and alternately adhered to a second material having a refractive index relatively high with respect to the refractive index of said first material, each of said layers having an optical thickness of one-quarter of a design wavelength, the design wavelength of each of said groups being different from each other, and wherein each low refractive index material of said groups of laminated layers comprises a transparent synthetic resin.

2. A filter according to claim 1, wherein said relatively low refractive index layer comprises a thermoplastic resin.

3. A filter according to claim 1, wherein said relatively low refractive index layer comprises a thermoplastic resin and a relatively low refractive index powder mixed into said thermoplastic resin.

4. A filter according to claim 1, wherein said relatively high refractive index layer comprises a transparent synthetic resin.

5. A filter according to claim 1, wherein said relatively high refractive index layer comprises a thermoplastic resin and a relatively high refractive index material mixed into said thermoplastic resin.

6. A filter according to claim 1, wherein said relatively high refractive index layer is made of a material chosen from the group consisting of Si and Ge.

7. A filter according to claim 1 further comprising a matching layer adhered closely to at least one of said groups of laminated layers.

8. A filter according to claim 3, wherein said relatively low refractive index powder has a refractive index less than about 1.5.

9. A filter according to claim 5, wherein the refractive index of said relatively high refractive index layer is more than about 2.0.

10. A filter according to claim 7, wherein said matching layer is made of a thermoplastic resin.

References Cited

UNITED STATES PATENTS

| | | | |
|---|---|---|---|
| 2,331,716 | 10/1943 | Nadeau et al. | 350—164X |
| 2,547,416 | 4/1951 | Skellett | 350—175(GnL)UX |
| 2,624,238 | 1/1953 | Widdop et al. | 350—166X |
| 3,276,943 | 10/1966 | Kawamura | 350—1X |

FOREIGN PATENTS

| | | | |
|---|---|---|---|
| 499,387 | 4/1937 | Great Britain | 350—166 |
| 1,104,138 | 2/1968 | Great Britain. | |

OTHER REFERENCES

Yamada et al., "Transmission Filters in the Far-Infrared Region," Journal of the Optical Society of America, vol. 52, January 1962, pp. 17–19.

DAVID SCHONBERG, Primary Examiner

T. H. KUSMER, Assistant Examiner

U.S. Cl. X.R.

117—33.3; 350—166